United States Patent
Karstens

(10) Patent No.: US 7,779,242 B2
(45) Date of Patent: Aug. 17, 2010

(54) DATA PROCESSING SYSTEM COMPONENT STARTUP MODE CONTROLS

(75) Inventor: Christopher Kent Karstens, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 548 days.

(21) Appl. No.: 11/317,393

(22) Filed: Dec. 22, 2005

(65) Prior Publication Data

US 2007/0150714 A1     Jun. 28, 2007

(51) Int. Cl.
*G06F 15/177* (2006.01)

(52) U.S. Cl. .......................................................... 713/1

(58) Field of Classification Search ....................... 713/1
See application file for complete search history.

(56) References Cited

U.S. PATENT DOCUMENTS

| | | | | |
|---|---|---|---|---|
| 5,274,816 A | 12/1993 | Oka | ........................... | 395/700 |
| 5,426,775 A | 6/1995 | Boccon-Gibod | ............. | 395/575 |
| 5,922,072 A | 7/1999 | Hutchinson et al. | ............ | 713/2 |
| 6,145,021 A * | 11/2000 | Dawson et al. | ................. | 710/8 |
| 6,505,248 B1 | 1/2003 | Casper et al. | ............... | 709/224 |
| 6,601,184 B1 | 7/2003 | Clark et al. | ..................... | 714/4 |
| 6,721,883 B1 | 4/2004 | Khatri et al. | .................... | 713/2 |
| 6,757,837 B1 | 6/2004 | Platt et al. | ........................ | 714/4 |
| 6,829,714 B2 | 12/2004 | Smith et al. | ................. | 713/330 |
| 7,213,139 B2 * | 5/2007 | Zhang | ........................... | 713/1 |
| 7,225,327 B1 * | 5/2007 | Rasmussen et al. | ............ | 713/2 |
| 2003/0135729 A1 | 7/2003 | Mason, Jr. et al. | ............. | 713/2 |
| 2004/0153724 A1 | 8/2004 | Nicholson et al. | .............. | 714/6 |

OTHER PUBLICATIONS

Charles M. Kozierok. "The PC Guide". Apr. 17, 2001. http://www.pcguide.com/ts/gen/diagOne-c.html.*
Barra et al., "Multimodal Monitoring of Web Servers", IEEE MultiMedia, Jul.-Sep. 2002, pp. 32-41.

* cited by examiner

*Primary Examiner*—Thomas Lee
*Assistant Examiner*—Eric Chang
(74) *Attorney, Agent, or Firm*—Yee & Associates, P.C.; Steven L. Bennett

(57) ABSTRACT

A computer implemented method, apparatus, and computer program usable program code for managing operation of a component in a data processing system. A startup mode is established for the component, wherein the startup mode controls whether the component will enter a minimum startup routine during startup of the data processing system.

15 Claims, 3 Drawing Sheets

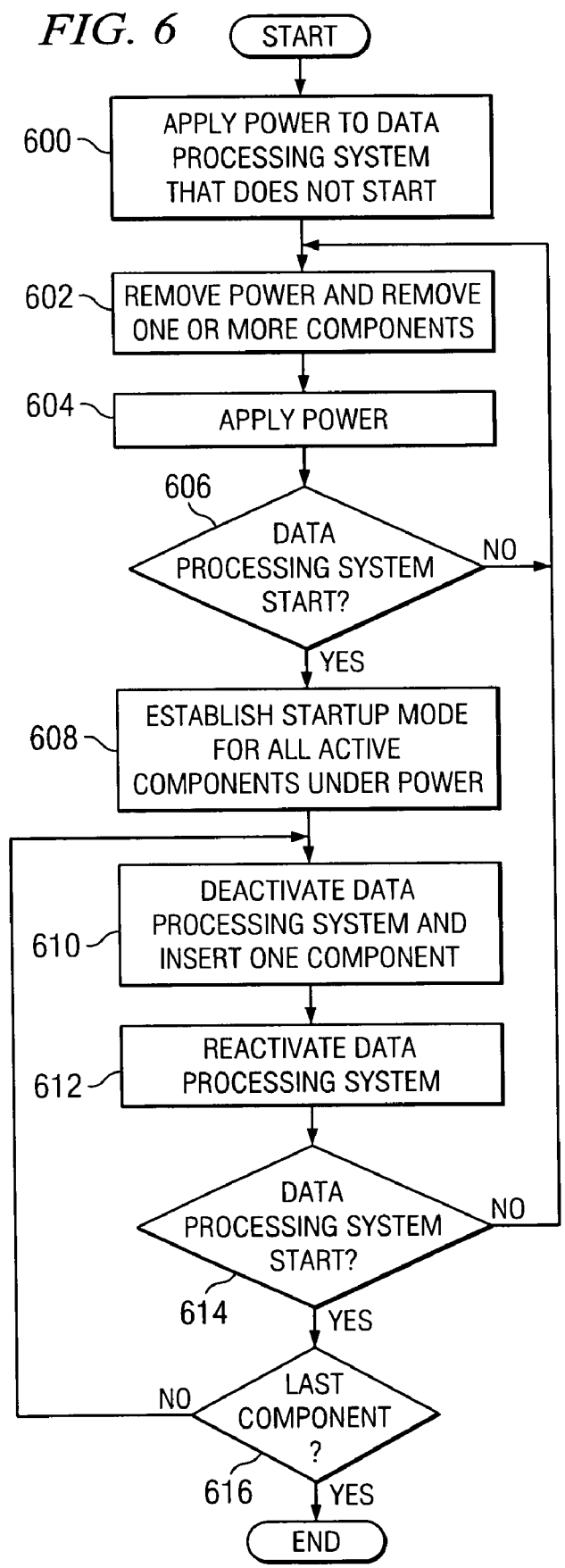

DATA PROCESSING SYSTEM COMPONENT STARTUP MODE CONTROLS

BACKGROUND OF THE INVENTION

1. Field of the Invention

The present invention relates generally to data processing systems and in particular to controlling components in a data processing system. Still more particularly, the present invention relates to a computer implemented method, apparatus, and computer usable program code for controlling startup routines of components in a data processing system during startup of the data processing system.

2. Description of the Related Art

Troubleshooting hardware components of a data processing system can be a long and laborious process. In a typical troubleshooting process, one or more components are removed from the data processing system and then the data processing system is started again. If the data processing system starts up correctly, then the data processing system is deactivated and a single component is placed back into the data processing system. The data processing system is started again. This process repeats until the problem component can be identified and replaced or repaired.

Although simple in concept, this process can be extremely time-consuming because a complex data processing system can have many components that interact with other components in the data processing system. In addition, complex data processing systems may require a significant amount of time to finish a startup routine.

For example, some complex servers can require about 10 minutes or more to go through a startup routine. If 24 components are to be checked, then the trouble-shooting process could require up to four hours just finish each of the startup routines, which does not include the time required to actually remove components and perform other desired activities involved with troubleshooting. These four hours are essentially wasted time in terms of actively isolating the problem component. The wasted time could translate into wasted money and other resources. Thus, methods and devices for reducing the time used to troubleshoot data processing systems having multiple components.

BRIEF SUMMARY OF THE INVENTION

The present invention provides a computer implemented method, apparatus, and computer program usable program code for managing operation of a component in a data processing system. A startup mode is established for the component, wherein the startup mode controls whether the component will enter a minimum startup routine during startup of the data processing system.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 is a flowchart of a trouble shooting process in a data processing system, in accordance with an illustrative example of the present invention.

DETAILED DESCRIPTION OF THE INVENTION

Figure 1:
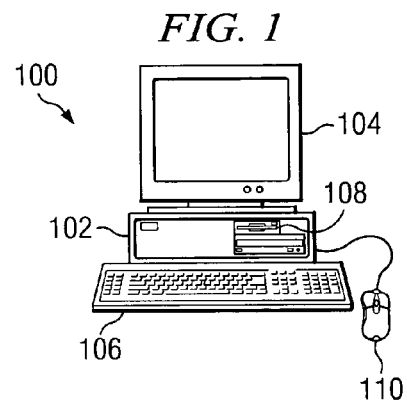
FIG. 1 is a pictorial representation of a data processing system in which the aspects of the present invention may be implemented.

FIG. 1 is a pictorial representation of a data processing system in which the aspects of the present invention may be implemented. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation® computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
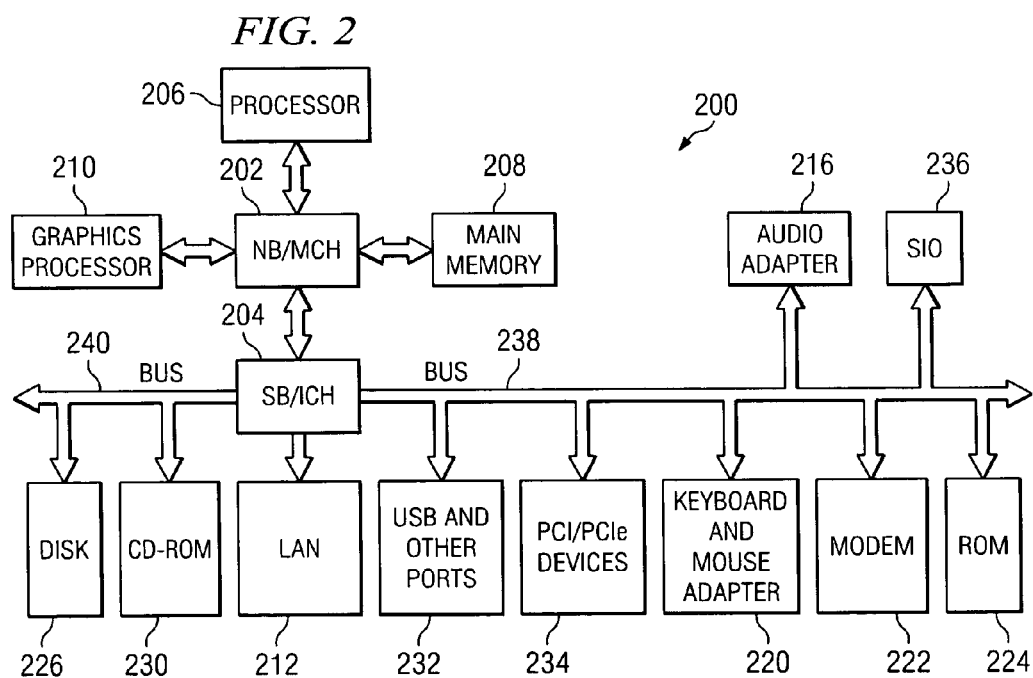
FIG. 2 is a block diagram of a data processing system in which aspects of the present invention may be implemented.

With reference now to FIG. 2, a block diagram of a data processing system is shown in which aspects of the present invention may be implemented. Data processing system 200 is an example of a computer, such as computer 100 in FIG. 1, in which code or instructions implementing the processes of the present invention may be located. In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are connected to north bridge and memory controller hub 202. Graphics processor 210 may be connected to the MCH through an accelerated graphics port (AGP), for example.

In the depicted example, local area network (LAN) adapter 212 connects to south bridge and I/O controller hub 204 and audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to south bridge and I/O controller hub 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be connected to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200 (Java is a trademark of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes of the present invention are performed by processor 206 using computer implemented instructions, which may be located in a memory such as, for example, main memory 208, read only memory 224, or in one or more peripheral devices.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The present invention provides a computer implemented method, apparatus, and computer program usable program code for managing operation of a component in a data processing system. A startup mode is established for the component, wherein the startup mode controls whether the component will enter a minimum startup routine during startup of the data processing system. The startup mode can be at least one of a normal mode, an impact mode, a pass-once mode, and a no-test mode. In the normal mode, the component starts up normally and performs all normal startup routines for that component during startup of the data processing system. In an impact mode, the component performs a minimum startup routine upon startup of the data processing system, unless something changes within the data processing system that impacts the component. When something changes that impacts the component, the component will attempt to perform all normal startup routines. In a pass-once mode, the component completes a normal startup routine one time and then, on future startups of the data processing system, the component will perform a minimum startup routine. In a no-test mode, the component will perform a minimum startup routine every time the data processing system is started. In an illustrative example, the minimum startup routine is no startup routine, such that the component does not startup during startup of the data processing system.

Figure 3:
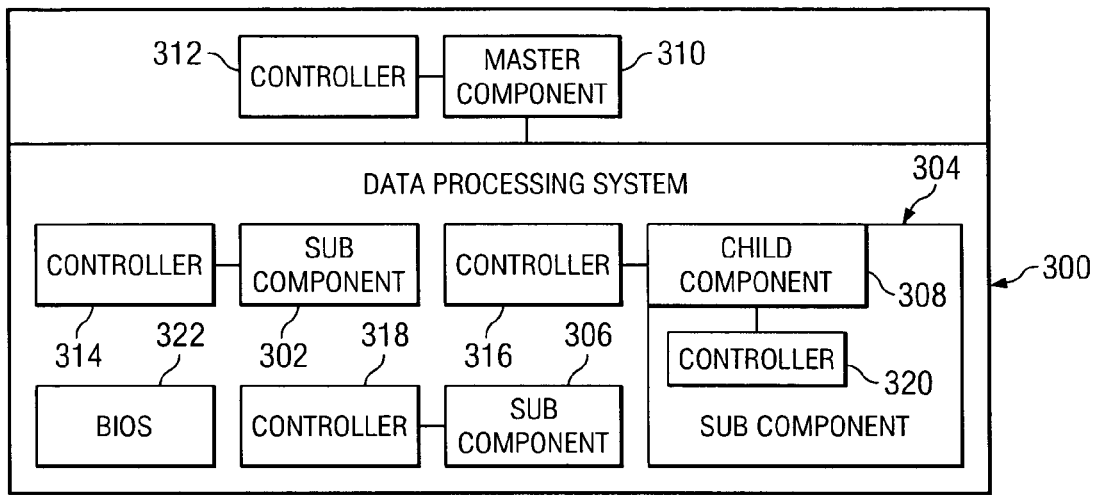
FIG. 3 is a block diagram of a data processing system, in accordance with an illustrative example of the present invention.

FIG. 3 is a block diagram of a data processing system, in accordance with an illustrative example of the present invention. Data processing system 300 can be any data processing system, such as data processing system 100 shown in FIG. 1 or data processing system 200 shown in FIG. 2. Data processing system 300 has a number of components, such as master component 310, sub component 302, sub component 304, and sub component 306. Master component 310 can control the startup routine of each of sub components 302, 304, and 306. In addition, each sub-component can have one or more child or grandchild components, such as child component 308. A child component is a component contained within or controlled by a component or sub component. A grandchild component is a component contained within or controlled by a child component. A sub component can be considered a child component of master component 310. Each of master component 310, sub component 302, sub component 304, sub component 306, and child component 308 can be any hardware component in a data processing system. Examples of hardware components include a video card, a disk controller card, a hard disk, a printer, a network connection or network card, a graphics card, an audio adapter, or any of the various components shown in FIG. 2, such as processing unit 206, graphics processor 210, NB/MCH 202, main memory 208, SB/ICH 204, disk 226, CD Rom 230, network adapter 212, USB port 232, PCI/PCIe devices 234, audio adapter 216, keyboard and/or mouse adaptor 220, modem 222, SIO 236, and ROM 224. In addition, hardware components can be any other form of hardware components used in a data processing system.

Each of the components can have a controller associated with it. For example, in the illustrative example of FIG. 3, master component 310 is associated with controller 312, sub component 302 is associated with controller 314, sub component 304 is associated with controller 316, sub component 306 is associated with controller 318, and child component 308 is associated with controller 320. Each of controllers 312, 314, 316, 318, and 320 control a startup mode for the associated component. As described below, a startup mode controls whether the associated component will enter a minimum startup routine during startup of the data processing system.

Each of controllers 312, 314, 316, 318, and 320 can be implemented using either hardware or software. For example, each controller can establish the mode of an associated component via software in a basic input/output system (BIOS), such as BIOS 322. Thus, each of controllers 312, 314, 316, 318, and 320 has access to BIOS 322. In another example, each controller can establish the mode of an associated controller using firmware. In yet another example, each controller can establish the mode of an associated component via hardware devices. Examples of hardware devices for establishing the mode of an associated component include a button, a toggle, a dip switch, a rotary dial, or some other device that a user or a data processing system can actuate to cause a particular mode to be established in a corresponding component.

In the illustrative example shown in FIG. 3, each component has an associated controller. However, not all components need have a separate controller. For example, master component 310 can control the behavior of sub components 302, 304, 306 and any child components such as child component 308. In this way, controller 312 can establish a startup mode for all of the components in data processing system 300. Likewise, controller 316 can establish a startup mode for both sub component 304 and child component 308.

Figure 4:
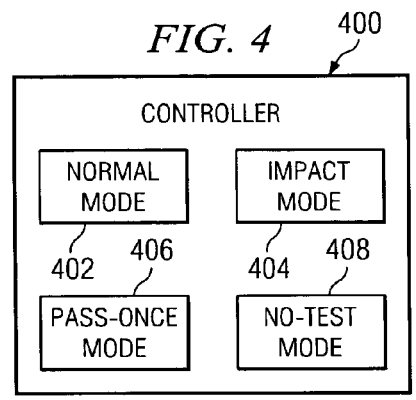
FIG. 4 is a block diagram of a controller used in the data processing system of FIG. 3, in accordance with an illustrative example of the present invention.

FIG. 4 is a block diagram of a controller used in the data processing system of FIG. 3, in accordance with an illustrative example of the present invention. Controller 400 can be any of controllers 312, 314, 316, 318, or 320 shown in FIG. 3. Controller 400 can establish a startup mode for a component associated with controller 400 using any of the methods described with respect to FIG. 3. The associated component can be any component or group of components in an associated data processing system, as shown and described with respect to FIG. 3.

In the illustrative example shown in FIG. 4, controller 400 can establish one of four modes for the associated component: Normal mode 402, impact mode 404, pass-once mode 406, and no-test mode 408. In normal mode 402, the associated component will execute all normal startup routines that the associated component undertakes during startup of the associated data processing system. In this way, the associated component will operate normally after the associated data processing system has completed startup.

In impact mode, an associated component will perform a minimum startup routine unless an event occurs in the associated data processing system that impacts that associated component. When something changes that impacts the component, the component will attempt to perform all normal startup routines. A minimum startup routine for a component is the minimum routine or activities that a component can take during startup of the associated data processing system such that the associated data processing system can still function after startup. In an illustrative example, a minimum startup routine is no startup routine. In this case, the associated component is completely inactive in the associated data processing system after the associated data processing system has completed startup. In another illustrative example, a minimum startup routine is a startup routine that allows an associated component to function such that data can be transmitted through the associated component, but the associated component performs no activities or actions with respect to the data or other components in the associated data processing system. In yet another illustrative example, a minimum startup routine allows a component to start up quickly, but then operate normally within the data processing system. For example, when a component initially starts up, the component can store startup data in the basic input output system (BIOS), in a local component flash, or in some other memory. The next time the component starts, unless something has changed, the component can retrieve the startup data from memory and use the stored startup data to start up and subsequently operate normally. However, by using the stored startup data, the startup time for the component is substantially reduced. In yet another illustrative example, a minimum startup routine is a startup routine in which any extended diagnostics available in a component are disabled or not executed. The component will start up much more quickly when the extended diagnostics are disabled or are not executed.

Returning to impact mode 404, as stated above, an associated component will perform a minimum startup routine unless an event occurs in the associated data processing system that impacts that associated component. Thus, in impact mode 404, an associated component will operate in normal mode 402 the first time that the associated data processing system is started. Thereafter, the associated component will perform a minimum startup routine each time the associated data processing system is started. However, if a change occurs in the associated data processing system between startups, and that change affects that associated component, then that associated component again returns to normal mode 402 to ensure that associated component operates correctly after the associated data processing system has successfully completed startup. If additional components are added and the associated data processing system is re-started additional times, then the associated component repeats this behavior if the associated component remains in impact mode 404.

In pass-once mode 406, an associated component completes a normal startup routine, as in normal mode 402, the first time the associated component is added to the associated data processing system and the associated data processing system is started next. Thereafter, if the associated data processing system is re-started, then the associated component performs a minimum startup routine.

In no-test mode 408, the associated component always performs a minimum startup routine every time the associated data processing system starts. Although each associated component is in one mode at a time in the illustrative example, the mode of an associated component can be switched at any appropriate time by a user or by a process in a data processing system. Thus, an associated component can switch between normal mode 402, impact mode 404, pass-once mode 406, and no-test mode 408 as desired by a user or as determined by software in a data processing system.

In addition, although only four modes are presented in the illustrative example of FIG. 4, additional modes can be created to control the startup routine of components in a data processing system. For example, a mode can cause a component to perform a normal startup routine twice and then enter a no-test mode. In another example, a mode can cause a component to perform a moderate startup routine that uses or performs more activities than a minimum startup routine, but that uses or performs fewer activities than a normal startup routine. Another mode is a time mode in which time is tracked and minimum, full, or partial startup routines for a component are initiated at startup depending on how much time has passed. For example, in a time mode a component can be set to a use minimum startup routine for a period of time, such as but not limited to four hours. Thereafter, the component returns to a normal startup routine. In another example of a time mode, a full startup routine is performed at a certain time and a minimum or a partial startup routine is performed at other times. The former example of a time mode is especially useful in a manufacturing environment where a line operator will not have to reset startup modes on a particular component in every data processing system checked. In another example, a customer may require that a data processing system be shipped and received with a "no-test" mode enabled for all components. In any case, controller 400 can control an associated component using many different modes other than those shown in FIG. 4.

In the illustrative embodiments described above, a user preferably manually sets the startup mode. However, a startup mode can be set automatically by the data processing system using, for example, the basic input output system (BIOS) of the data processing system. For example, during a startup routine, a BIOS can have one or more checkpoints. Different components in the data processing system are activated only after specific checkpoints. In a specific example, 80 checkpoints exist in a BIOS during startup. After checkpoint 56, the network adaptors of the data processing system start up. However, after the network adaptors start up, the data processing system hangs. At this point, the data processing system can be programmed to automatically restart the data processing system when too much time (a time defined by a user) is spent at checkpoint 56. The next time the system is powered on, or when startup is completed, the user can be prompted to check the network adaptors. For example, the data processing system can prompt the user as follows: "Network adaptors appeared to cause the system to hang. Consider replacing them to see if it corrects the problem. The adapters have been automatically disabled. Would you like to re-enable them now? [Y/N]"

In addition to the above examples, a startup mode can be assigned independently to each component in a data processing system. Thus, not all components of a data processing system must have the same startup mode. For example, one component can be assigned a "no test" mode, a second component can be assigned an "impact mode," and yet another component can be assigned a "time mode."

Furthermore, an assigned mode for a given component can be changed automatically, depending on the behavior of the given component during a startup. For example, if a component starts up normally in "normal mode" during an initial startup, then software or hardware can cause that component to automatically be assigned to an "impact mode." Thus, on future startups, that component will only execute a normal startup routine if that component is affected by some change in the data processing system. In another example, any component that hangs during a normal startup routine can be automatically assigned to a "no-test" mode so that the data processing system can complete the overall startup process upon restart.

Figure 5:
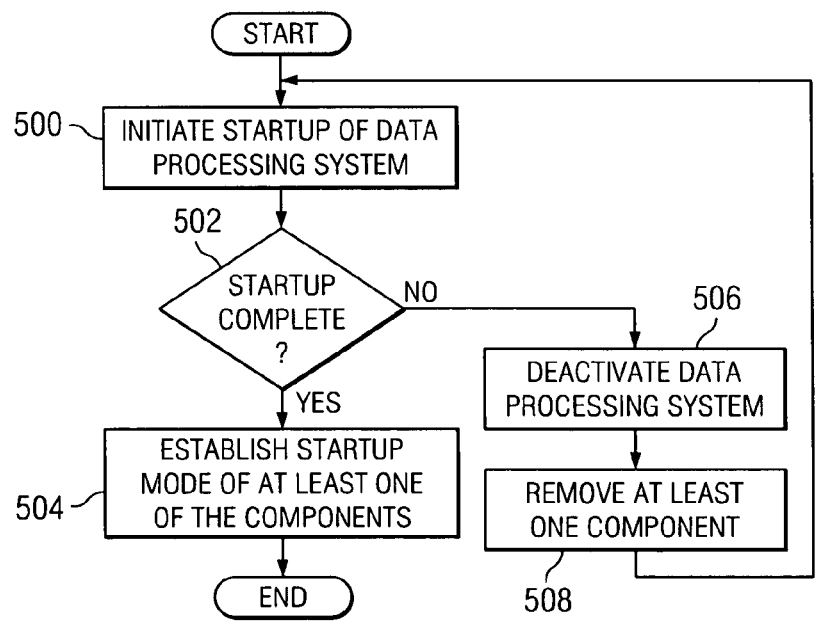
FIG. 5 is a flowchart of a trouble shooting process in a data processing system, in accordance with an illustrative example of the present invention.

FIG. 5 is a flowchart of a trouble shooting process in a data processing system, in accordance with an illustrative example of the present invention. The process shown in FIG. 5 can be implemented in a data processing system, such as data processing system 100 shown in FIG. 1, data processing system 200 shown in FIG. 2, and data processing system 300 shown in FIG. 3 using methods and devices described vis-à-vis FIG. 3 and FIG. 4.

Initially, the process shown in FIG. 5 begins as a user, software, or hardware initiates startup of a data processing system (step 500). Next, a determination is made whether the startup of the data processing system is complete (step 502). The steps of starting the data processing system in step 500 and determining whether the startup is complete in step 500 are optional because in other illustrative examples, the step of establishing a startup mode in step 504 can be accomplished before the associated data processing system is started.

If the data processing system does not start up successfully, then the user, software, or hardware deactivates the data processing system (step 506). Deactivating the data processing system can be accomplished by removing power from the data processing system or otherwise taking the data processing system offline. Next, the user, software, or hardware removes at least one component from the data processing system (step 508). Removing a component from a data processing system can be accomplished by physically removing the component from the data processing system, removing power to the individual component, establishing a "no test" mode for a component, or otherwise isolating the component from the data processing system. Thereafter, the process returns to step 500.

Returning to step 502, if startup of the data processing system is successful, then a user, software, or other component of the data processing system establishes a startup mode of at least one component currently within the data processing system (step 504). As described above with respect to FIG. 4, the startup mode for each component can be a normal mode, an impact mode, a pass-once mode, a no-test mode, or some other mode.

FIG. 6 is a flowchart of a trouble shooting process in a data processing system, in accordance with an illustrative example of the present invention. The process shown in FIG. 6 can be implemented in a data processing system, such as data processing system 100 shown in FIG. 1, data processing system 200 shown in FIG. 2, and data processing system 300 shown in FIG. 3 using methods and devices described vis-à-vis FIG. 3 and FIG. 4.

Initially, the process shown in FIG. 6 begins as a user applies power to a data processing system in an attempt to startup the data processing system, but the data processing system does not start (step 600). In response, the user removes power from the data processing system and also removes one or more components of the data processing system (step 602). The removal of the components is performed in an attempt to isolate which component in the data processing system is causing startup of the data processing system to fail or to hang. The user then reapplies power to the data processing system and initiates startup of the data processing system (step 604). The user then determines whether the data processing system starts (step 606). If the data processing system does not start, then the process returns to step 602.

However, if the data processing system does start successfully, then the user, software, or hardware in the data processing system establishes a startup mode for all active components under power (step 608). The startup mode for each component can be one of a normal mode, an impact mode, a pass-once mode, a no-test mode, or some other mode, as described vis-à-vis FIG. 3 and FIG. 4.

Next, the user, software, or hardware deactivates the data processing system and the user inserts one component into the data processing system (step 610). Deactivating the data processing system can be accomplished using one of several techniques. The data processing system can be deactivated by removing power from the system. The data processing system can also be "deactivated" by setting a "no test" mode for each component in the data processing system and then restarting the data processing system. The data processing system can also be deactivated using some other method of taking the data processing system offline. In any case, the user, software, or hardware then reactivates the data processing system, applying power as needed (step 612). The user, software, or hardware then determines whether the data processing system starts successfully (step 614). If the data processing system does not start successfully, then the process returns to step 602.

If the data processing system does start successfully, then the user, software, or hardware determines whether the component added is the last component to be added to the data processing system. If more components are to be added to the data processing system, then the process returns to step 610. However, if the last component has been added to the data processing system, then the process terminates.

The mechanism and methods of the present invention provide several advantages over known methods for troubleshooting data processing systems. Once a component has been established as being functional in a data processing system, then that component can be set to execute a minimum startup routine or can be rendered effectively inactive for purposes of starting up the data processing system. Thus, on future startups, the startup time of the data processing system is less than the startup time of the data processing system combined with the normal startup time of the component. Accordingly, time is saved each time the data processing system is restarted.

For example, a user attempts to start a data processing system, but the data processing hangs for some reason. The user then removes key components and then restarts the data processing system. The data processing system, less the key components, then starts in twelve minutes due to the startup routine performed by each active component. The user sets a "no test" mode or an "impact mode" for each active component in the data processing system. The user then deactivates the data processing system, adds one of the key components, and reactivates the data processing system. This time, the data processing system activates in four minutes, instead of sixteen minutes that would be required had all of the other components remained in normal mode. The user then sets the mode of the new key component to "no-test" or "impact". The user then repeats the process of deactivating the data processing system, adding one key component, reactivating the data processing system, and setting the startup mode of a newly added component until the faulty component is isolated. The faulty component is isolated when the data processing system hangs or when it is identified that that component prevents other components from starting.

Continuing the above example, four key components are removed and are to be added back in. For whatever reason, the fourth key component is the last to be tested in the manner described and is the faulty component. Thus, the data processing system is re-started at least four times, once for the initial successful startup and three more times for each of the non-faulty components. At each re-start the non-faulty components need not execute startup routines, or can execute minimum startup routines, because of the mechanism and methods of the present invention. Thus, the first successful restart saves twelve minutes, and the second successful restart saves twelve minutes plus four minutes, or sixteen minutes. Similarly, the third successful restart saves twelve minutes plus four minutes plus four minutes, or twenty minutes. Along a similar vein, the fourth successful restart saves twenty-four minutes. Thus, the total time saved during the trouble shooting process is seventy-two minutes, which is over an hour of saved time.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented method to reduce a total startup time during troubleshooting of hardware components in a data processing system, the computer-implemented method comprising:

removing power from a set of one or more components in the data processing system to form a set of removed components;

connecting a first component to the data processing system during a troubleshooting, wherein the first component belongs with the set of removed components;

establishing a first startup mode for the first component, wherein the first startup mode is a minimum startup mode, wherein the minimum startup mode controls a minimum startup routine for future startups of the data processing system during the troubleshooting, wherein the minimum startup mode comprises one of an impact mode, a pass-once mode, and a no-test mode;

initiating startup of the data processing system;

responsive to the data processing system successfully completing startup, deactivating the data processing system;

inserting a second component into the data processing system, wherein the second component belongs with the set of removed components;

establishing a second startup mode for the second component, wherein the second startup mode is a second minimum startup routine belonging to the second component and wherein the second minimum startup mode comprises one of an impact mode, a pass-once mode, and a no-test mode;

initiating a second startup of the data processing system, wherein the minimum startup mode for the first component is initiated in addition to the minimum startup mode for the second component, wherein the first component and the second component belong to the set of removed components; and repeating the removing of the power step, the connecting step, the establishing of a startup mode step, and the initiating step for subsequent components from the set of removed components until a condition occurs, wherein the condition indicates a faulty component in the data processing system has been located.

2. The computer-implemented method of claim 1, wherein the condition comprises an event corresponding to a failure of the data processing system to start or the faulty component is identified to prevent other components from starting.

3. The computer-implemented method of claim 1 further comprising:
responsive to the data processing system not successfully completing startup, repairing the first component, whereby the first component causes a failure of the data processing system to startup.

4. The computer-implemented method of claim 1 wherein the set of removed components are each associated with hardware devices, wherein the hardware devices actuate the minimum startup mode.

5. The computer-implemented method of claim 1, wherein the impact mode comprises performing a minimum startup routine upon startup of the data processing system unless a change occurs within the data processing system that impacts the associated component.

6. The computer-implemented method of claim 1 further comprising:
associating a controller with each associated component, wherein each controller can establish the minimum startup mode of the each associated component using firmware.

7. The computer-implemented method of claim 1, wherein the pass-once mode comprises completing a normal startup routine at least once and then performing the minimum startup routine on the future startups of the data processing system.

8. A computer program product stored on a recordable-type computer readable medium for troubleshooting hardware components in a data processing system, the computer-program product comprising:
removing power from a set of one or more components in the data processing system to form a set of removed components;
connecting a first component to the data processing system during a troubleshooting, wherein the first component belongs with the set of removed components;
establishing a first startup mode for the first component, wherein the first startup mode is a minimum startup mode, wherein the minimum startup mode controls a minimum startup routine for future startups of the data processing system during the troubleshooting, wherein the minimum startup mode comprises one of an impact mode, a pass-once mode, and a no-test mode;
initiating startup of the data processing system;
responsive to the data processing system successfully completing startup, deactivating the data processing system;
inserting a second component into the data processing system, wherein the second component belongs with the set of removed components;
establishing a second startup mode for the second component, wherein the second startup mode is a second minimum startup routine belonging to the second component and wherein the second minimum startup mode comprises one of an impact mode, a pass-once mode, and a no-test mode;
initiating a second startup of the data processing system, wherein the minimum startup mode for the first component is initiated in addition to the minimum startup mode for the second component, wherein the first component and the second component belong to the set of removed components; and
repeating the removing of the power step, the connecting step, the establishing of a startup mode step, and the initiating step for subsequent components from the set of removed components until a condition occurs, wherein the condition indicates a faulty component in the data processing system has been located.

9. The computer program product of claim 8, wherein the condition comprises an event corresponding to a failure of the data processing system to start or the faulty component is identified to prevent other components from starting.

10. The computer program product of claim 8 further comprising:
responsive to the data processing system not successfully completing startup, repairing the first component, whereby the first component causes a failure of the data processing system to startup.

11. The computer program product of claim 8, wherein the set of removed components are each associated with hardware devices, wherein the hardware devices actuate the minimum startup mode.

12. The computer program product of claim 8, wherein the impact mode comprises performing a minimum startup routine upon startup of the data processing system unless a change occurs within the data processing system that impacts the associated component.

13. The computer program product of claim 8, wherein the pass-once mode comprises completing a normal startup routine at least once and then performing the minimum startup routine on the future startups of the data processing system.

14. The computer program product of claim 8, further comprising:
associating a controller with each associated component, wherein each controller can establish the minimum startup mode of the each associated component using firmware.

15. A data processing system for troubleshooting hardware components in a data processing system, the data processing system comprising:
a bus;
a communications system connected to the bus;
a memory connected to the communications system; and
a processing unit connected to the memory, wherein the processing unit executes a set of instructions to remove power from a set of one or more components in the data processing system to form a set of removed components; to connect a first component to the data processing system during a troubleshooting, wherein the first component belongs with the set of removed components; to establish a first startup mode for the first component, wherein the first startup mode is a minimum startup mode, wherein the minimum startup mode controls a minimum startup routine for future startups of the data processing system during the troubleshooting, wherein the minimum startup mode comprises one of an impact mode, a pass-once mode, and a no-test mode; to initiate startup of the data processing system; to deactivate the data processing system, responsive to the data processing system successfully completing startup; to insert a second component into the data processing system, wherein the second component belongs with the set of removed components; to establish a second startup mode for the second component, wherein the second startup mode is a second minimum startup routine belonging to the second component and wherein the second minimum startup mode comprises one of an impact mode, a pass-once mode, and a no-test mode; to initiate a second startup of the data processing system, wherein the minimum startup mode for the first component is initiated in addition to the minimum startup mode for the second component, wherein the first component and the second component belong to the set of removed components; and to repeat the removing of the power step, the connecting step, the establishing of a startup mode step, and the initiating step for subsequent components from the set of removed components until a condition occurs, wherein the condition indicates a faulty component in the data processing system has been located.

* * * * *